(12) United States Patent
Mori et al.

(10) Patent No.: US 8,535,035 B2
(45) Date of Patent: Sep. 17, 2013

(54) FINE-STRUCTURE TRANSFER APPARATUS

(75) Inventors: Kyoichi Mori, Kodama-gun (JP);
Noritake Shizawa, Kodama-gun (JP);
Naoaki Yamashita, Kodama-gun (JP);
Koji Tsushima, Kodama-gun (JP);
Toshimitsu Shiraishi, Kodama-gun (JP)

(73) Assignee: Hitachi High-Technologies Corporation, Tokyo (JP)

( * ) Notice: Subject to any disclaimer, the term of this patent is extended or adjusted under 35 U.S.C. 154(b) by 449 days.

(21) Appl. No.: 12/787,483

(22) Filed: May 26, 2010

(65) Prior Publication Data
US 2010/0303947 A1 Dec. 2, 2010

(30) Foreign Application Priority Data

Jun. 2, 2009 (JP) .................................. 2009-132804

(51) Int. Cl.
*B29C 59/00* (2006.01)
(52) U.S. Cl.
USPC ..................... 425/174.4; 425/385; 425/403.1; 425/810
(58) Field of Classification Search
USPC ................... 425/174.4, 385, 403.1, 388, 409, 425/810; 264/1.33, 1.36, 1.38, 101, 293
See application file for complete search history.

(56) References Cited

U.S. PATENT DOCUMENTS

| | | | |
|---|---|---|---|
| 3,809,357 A * | 5/1974 | Gallap | 249/161 |
| 5,772,905 A | 6/1998 | Chou | |
| 6,280,178 B1 * | 8/2001 | Khan | 425/409 |
| 6,601,629 B2 * | 8/2003 | Toyoda et al. | 264/334 |
| 6,659,759 B2 * | 12/2003 | Anzai et al. | 425/174.4 |
| 7,547,205 B2 * | 6/2009 | Chen et al. | 425/174.4 |
| 8,029,706 B2 * | 10/2011 | Murota | 425/174.4 |
| 8,192,920 B2 * | 6/2012 | Kobrin | 430/322 |

FOREIGN PATENT DOCUMENTS

| | | |
|---|---|---|
| JP | 2001-058352 A | 3/2001 |
| JP | 2007-019451 A | 1/2007 |
| JP | 2008-12844 A | 1/2008 |

OTHER PUBLICATIONS

Japanese Office Action received in Japanese Application No. 2009-132804 dated Dec. 18, 2012.

* cited by examiner

*Primary Examiner* — Richard Crispino
*Assistant Examiner* — Thukhanh Nguyen
(74) *Attorney, Agent, or Firm* — Mattingly & Malur, PC (57) ABSTRACT

A fine-structure transfer apparatus has a base plate, a first post and a second post erected on the upper surface of the base plate, an elongated stamper that is fixed at one end to the upper end face of the first post. The stamper is supported at the other end in a vertically movable manner by means of an ascending/descending unit provided on the second post. A transfer element holding stage is provided on the upper surface of the base plate between the first and second posts in a position that corresponds to the position of the lower surface of the elongated stamper where a fine pattern is formed. A pressure-applying unit is provided to reciprocate on the upper surface of the elongated stamper along a longitudinal direction thereof. The transfer apparatus is characterized by the ease with which the stamper can be detached from the transfer element.

11 Claims, 8 Drawing Sheets

FIG. 10

FINE-STRUCTURE TRANSFER APPARATUS

TECHNICAL FIELD

The present invention relates to a fine-structure transfer or nanoimprint apparatus. More particularly, the present invention relates to a fine-structure transfer or nanoimprint apparatus that not only allows a stamper to be easily attached to and detached from a transfer element but also effectively prevents the occurrence of air bubbles as a transfer defect.

BACKGROUND ART

With remarkable advances in the performance of computers and other information equipment, the volume of information that is handled by users has been constantly increasing and the unit of measurement is now in terabytes rather than gigabytes. Under these circumstances, there exists an ever-growing demand for semiconductor devices such as information storage/reproduce equipment and memories that are capable of recording at even higher densities.

To achieve higher recording densities, technologies for even finer microfabrication are required. Conventional photolithography which uses the exposure process is capable of microfabrication over a large area in one step; however, since its resolution is not finer than the wavelength of light, conventional photolithography is inevitably unsuitable for creating fine structures smaller than the wavelength of light (say, 100 nm and less). Technologies currently available for processing finer structures than the wavelength of light include exposure using electron beams, exposure using X-rays, and exposure using ion beams. However, pattern formation with an electron beam lithographic apparatus differs from patterning by one-shot exposure using such light sources as i-line and an excimer laser in that the more patterns that need be written with electron beams, the longer the time that is required for writing (exposure). Therefore, as the recording density increases, the time it takes to form a fine-featured pattern is prolonged to cause a marked drop in throughput. With a view to forming patterns at a faster speed by the e-beam lithographic equipment, the development of a method for one-shot irradiation of geometric figures is underway in which combinations of variously shaped masks are subjected to one-shot exposure to electron beams; however, the e-beam lithographic apparatus that uses the method for one-shot irradiation of geometric figures is not only bulky but it also needs an additional mechanism for controlling the positions of masks to an even higher precision; this increases the cost of the lithographic apparatus, eventually leading to a higher cost for manufacturing the media.

Printing-based approaches have been proposed as an alternative to the conventional exposure technologies for creating fine structures smaller than the wavelength of light. See, for example, US 005772905A which describes an invention relating to the technology of nanoimprint lithography (NIL). The technology of nanoimprint lithography (NIL) is a technique in which a pattern of predetermined fine structures is formed on a mold by exposure to electron beams or using some other methods of creating finer structures than the wavelength of light and the mold is urged under pressure against a resist-coated transfer substrate so that the fine-structured pattern is transferred to the resist coating on the transfer substrate. As long as the mold is available, there is no particular need to employ an expensive exposure unit but an apparatus in the class of ordinary printing presses will suffice to produce replicas in large quantities; hence, in comparison with the conventional methods such as exposure to electron beams, there is achieved a marked improvement in throughput whereas the manufacturing cost is significantly reduced.

As descried in US 005772905A, when a thermoplastic resin (say, PMMA) is used as a resist material in the technology of nanoimprint lithography (NIL), transfer is performed with the thermoplastic resin being heated under pressure to a temperature near its glass transition temperature (Tg) or higher. This approach is called a thermal transfer process. The thermal transfer process has the advantage of permitting the use of general-purpose, thermoplastic resins. If a photosensitive resin is used as a resist in the NIL technology, a photo-curable resin that hardens upon exposure to light such as UV radiation is chosen as the resin to which the original fine-featured pattern is transferred. This approach is called an optical transfer process.

In the nanoimprint processing technology using the optical transfer process, a special photocurable resin must be used but, on the other hand, compared to the thermal transfer process, the optical transfer process has the advantage of reducing the dimensional errors in finished products due to the thermal expansion of transfer printing plates or printing media. Other advantages that are related to the apparatus include elimination of the need for equipping it with a heating mechanism and providing accessories such as for performing temperature elevation, temperature control, and cooling. There is a further advantage concerning the nanoimprint apparatus taken as a whole and that is elimination of the need for design considerations against thermal distortions, such as heat insulation.

An example of nanoimprint apparatuses based on the optical transfer process is described in JP 2008-12844A. This apparatus is so designed that a stamper capable of transmitting UV light is urged against a photocurable resin coated transfer substrate and irradiated with UV light from above. The stamper has a predetermined pattern of fine structures formed in the surface that is to be pressed against the transfer substrate.

FIG. 9 in the accompanying drawings is a schematic diagram showing major steps in a fine-structure transfer method involving the nanoimprint technology based on the optical transfer process. In step (*a*), a transfer element 100 comprising a substrate 102 coated with a resist 104 on its topside is placed in a face-to-face relationship with a stamper 108 having a fine-featured pattern 106 formed on the side that is to be brought into contact with the resist 104. In step (*b*), the stamper 108 is pressed against the resist-coated surface of the transfer element 100. In step (*c*), ultraviolet (UV) light is applied to the stamper 108 from above, whereby the resist 104 is hardened. Then, in step (*d*), the stamper 108 is detached from the transfer element 100, leaving a patterned layer 110 on a surface of the substrate 102 of the transfer element 100. The patterned layer 110 is the obverse image of the fine-featured pattern 106.

Figure 9A:
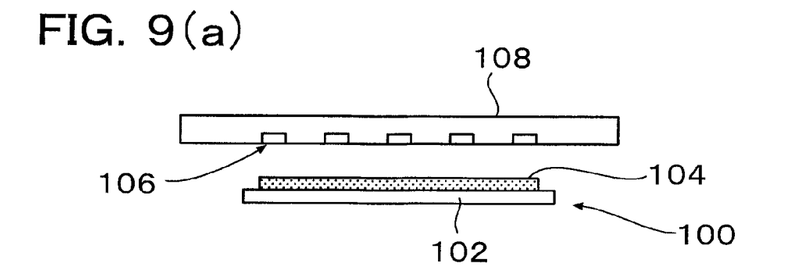
Figure 10:
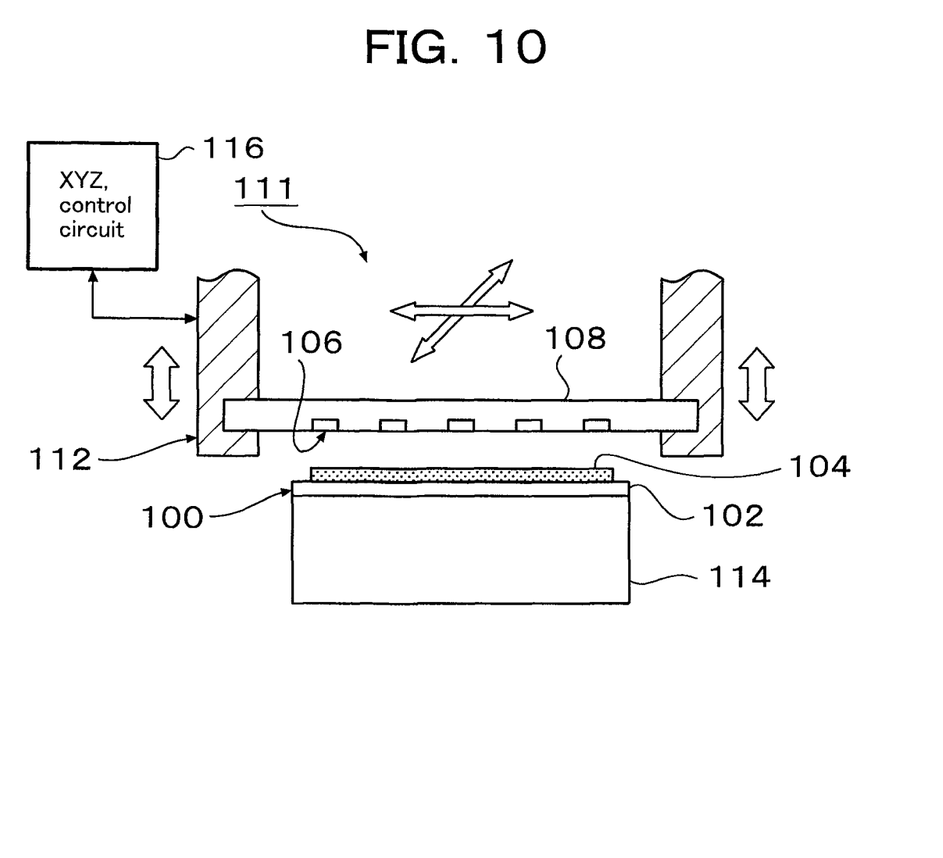
FIG. 10 shows an outline of a press mechanism conventionally used to press the stamper of FIG. 9 against a transfer element.

To press the stamper 108 against the transfer element 100, a press mechanism is used, as indicated by 111 in FIG. 10. The conventional press mechanism 111 generally comprises a uniaxial moving stage 112 which is a combination of a linear guide and a servo motor. With the transfer element 100 being fixed on a base 114, the stamper 108 mounted on the moving stage 112 is moved down so that it is urged against the transfer element 100. The moving stage 112 is controlled by an XYZ control circuit 116. Since the positions of the transfer element 100 and the stamper 108 are important for precision in transfer, the moving stage 112 requires precision in both motion and position. Consequently, the press mechanism 111 has assumed a bulky and complicated structure.

Figure 9B:
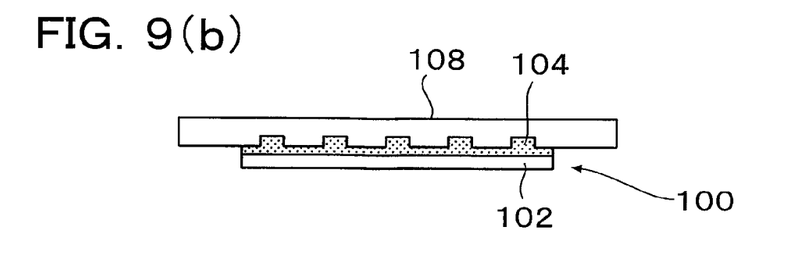

Another problem with the conventional press mechanism 111 is the occurrence of transfer defects due to air bubbles. If the pressing of the stamper 108 in the position shown in step (a) of FIG. 9 into intimate contact with the resist 104 as shown in step (b) is performed in the atmosphere, air bubbles are trapped in the space between the recesses in the fine-featured pattern 106 on the stamper 108 and the resist 104 and even after the pressing action is over, those air bubbles will stay unremoved, causing the external shape of the resist 104 to be fixed as irregularly deformed. This makes it difficult or even impossible to ensure that the shape of the fine-featured pattern 106 is transferred correctly.

Figure 9C:
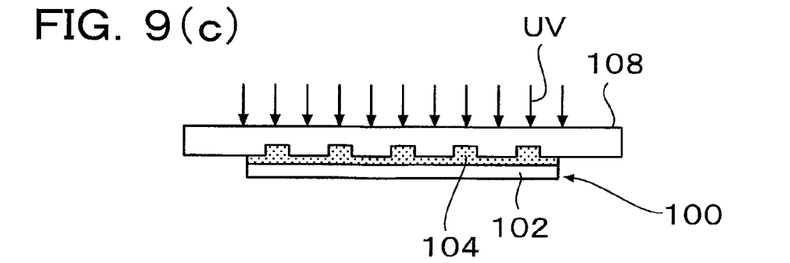
Figure 9D:
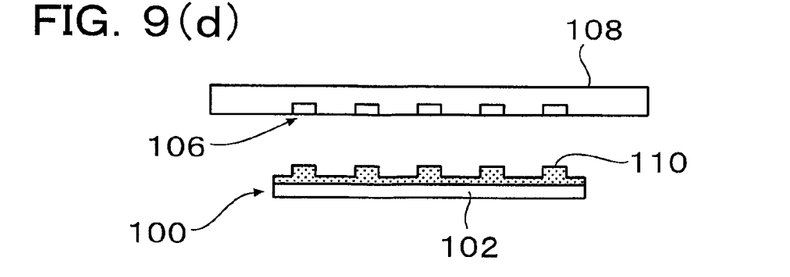

Still another problem with the conventional press mechanism 111 is the difficulty involved in detaching the stamper 108 from the transfer element 100. After the stamper 108 has been pressed into contact with the transfer element 100 and pattern transfer effected as shown in step (c) of FIG. 9, the stamper 108 has to be detached from the transfer element 100 in subsequent step (d). If the stamper 108 and the transfer element 100 are securely adhered to each other via the hardened resist 104, it is extremely difficult to detach the stamper 108 from the transfer element 100. A wedge or the like may be inserted from the outside to form a gap between the transfer element 100 and the stamper 108 so that the stamper 108 can be gradually detached from the transfer element 100; however, this method takes so much time and labor that the operating efficiency drops considerably. In addition, when a wedge or the like is being driven into the interface between the transfer element 100 and the stamper 108 that are in intimate contact with each other, the transfer element 100 and/or the stamper 108 might be damaged.

SUMMARY OF THE INVENTION

Technical Problem

An object, therefore, of the present invention is to provide a fine-structure transfer apparatus that does not use anything like the conventional press mechanism and which is not only free from the occurrence of transfer defects due to air bubbles but also characterized by ease with which the stamper can be detached from the transfer element.

Another object of the present invention is to provide a two-side fine-structure transfer apparatus that does not use anything like the conventional press mechanism and which is not only free from the occurrence of transfer defects due to air bubbles but also characterized by ease with which the stamper can be detached from the transfer element.

Solution to the Problem

The first object of the present invention can be attained by a fine-structure transfer apparatus comprising a base plate, a first post and a second post erected on the upper surface of the base plate, an elongated stamper that is fixed at one end to the upper end face of the first post and which is supported at the other end in a vertically movable fashion by means of an ascending/descending unit provided on the second post, a transfer element holding stage provided on the upper surface of the base plate between the first and second posts in a position that corresponds to that position of the lower surface of the elongated stamper where a fine pattern is formed, and a pressure-applying unit provided to reciprocate on the upper surface of the elongated stamper along a longitudinal direction of the elongated stamper.

In this fine-structure transfer apparatus, the ascending/descending unit may be a pivoting arm that pivots through a predetermined angle about a mounting shaft provided on the second post, the free end of the pivoting arm being in engagement with the other end of the elongated stamper, whereby the elongated stamper is supported in a vertically movable fashion.

In the fine-structure transfer apparatus, the ascending/descending unit may be a horizontal arm supported by a drive mechanism provided on the second post to move up and down in a vertical direction, the free end of the horizontal arm being in engagement with the other end of the elongated stamper, whereby the elongated stamper is supported in a vertically movable fashion.

In the fine-structure transfer apparatus, the pressure-applying unit may consist of one or more pressure-applying rollers that rotate to move in contact with the upper surface of the elongated stamper.

In the fine-structure transfer apparatus, the pressure-applying unit may be an air pad that moves along, while making no contact with, the upper surface of the elongated stamper as it applies high-pressure air to the upper surface of the elongated stamper.

In the fine-structure transfer apparatus, an engagement finger for engaging the free end of the pivoting arm may be fastened to the upper surface of the other end of the elongated stamper and provided in an end portion with an engagement hook for preventing the free end of the pivoting arm from dropping out.

The second object of the present invention can be attained by a two-side fine-structure transfer apparatus for transferring a fine structure to both sides of a transfer element or an annular disk of substrate having a through-hole of a predetermined inner diameter in the center, which apparatus comprises a lower fine-structure transfer device and an upper fine-structure transfer device, wherein:

the lower fine-structure transfer device comprises a base plate, a first post and a second post erected to face up on the upper surface of the base plate, a lower elongated stamper that is fixed at one end to the upper end face of the first post and which is supported at the other end in a vertically movable fashion by means of an ascending and descending unit provided on the second post, a transfer element holding cylindrical stage provided on the upper surface of the base plate between the first and second posts in a position that corresponds to that position of the upper surface of the lower elongated stamper where a fine-featured pattern is formed, a lower pressure-applying unit provided on the upper surface of the base plate for pressing the lower elongated stamper against the lower surface of the transfer element from below the lower elongated stamper, and a lower UV light irradiating unit provided on the lower surface of the base plate, the transfer element holding cylindrical stage having a cylindrical projection of a predetermined outer diameter provided on the upper end face, a through-hole of a predetermined inner diameter being opened in the center of the fine-featured pattern on the upper side of the lower elongated stamper, and the transfer element holding cylindrical stage being passed through the through-hole; and the upper fine-structure transfer device comprises a base plate, a first post and a second post erected to face down on the lower surface of the base plate, an upper elongated stamper that is fixed at one end to the upper end face of the first post and which is supported at the other end in a vertically movable fashion by means of an ascending/descending unit provided on the second post, an upper pressure-applying unit provided on the lower surface of the base plate for pressing the upper elongated stamper against the upper surface of the transfer element from above the upper elongated stamper, and an upper UV light irradiating unit provided on the upper surface of the base plate, a through-hole of a predetermined inner diameter being opened in the center of the fine-featured pattern on the lower side of the upper elongated stamper such that the cylindrical projection on the upper end face of the transfer element holding cylindrical stage can be passed through the through-hole; and wherein the lower fine-structure transfer device and the upper fine-structure transfer device are positioned in symmetry with respect to the center point of the transfer element holding cylindrical stage.

In this two-side fine-structure transfer apparatus, each of the ascending/descending units may be a pivoting arm that pivots through a predetermined angle about a mounting shaft provided on the associated second post, the free end of the pivoting arm being in engagement with the other end of the associated elongated stamper, whereby the associated elongated stamper is supported in a vertically movable fashion.

In the two-side fine-structure transfer apparatus, each of the ascending/descending units may be a horizontal arm supported by a drive mechanism provided on the associated second post to move up and down in a vertical direction, the free end of the horizontal arm being in engagement with the other end of the associated elongated stamper, whereby the associated elongated stamper is supported in a vertically movable fashion.

In the fine-structure transfer apparatuses described above, each of the lower and upper elongated stampers may have flexibility.

Advantageous Effects of the Invention

In the fine-structure transfer apparatus according to the first aspect of the present invention, a flexible stamper is rendered to have an elongated structure and by fixing one of its end while designing the other end to be vertically movable, the stamper can be deformed into a curved shape so that the entire surface of the transfer element is gradually covered with the curved stamper, starting from its outer periphery and directed radially towards its center. As a result, the air present at the interface between the stamper and the transfer element will be pushed to the outside of the interface as the transfer element is being covered with the stamper, ensuring that no air will be left at the interface. This substantially eliminates transfer defects that would otherwise occur on account of air bubbles in the conventional fine-structure transfer apparatus. When the transfer step is over, the stamper is gradually detached from the transfer element, starting from its outer periphery and directed radially towards its center, thus eliminating the heretofore required step of driving a wedge or the like into the interface between the stamper and the transfer element. As a result, the detaching operation will proceed rapidly enough to achieve a marked improvement in efficiency; what is more, little damage will be caused to the transferred pattern, as well as to the stamper and the transfer element.

In the two-side fine-structure transfer apparatus according to the second aspect of the present invention, by providing an upper and a lower transfer device each using a flexible stamper rendered to have an elongated structure and having one end of the associated flexible stamper fixed while designing the other end to be vertically movable, a fine-featured pattern can be transferred to both surfaces of the transfer element in a very easy and efficient manner.

BRIEF DESCRIPTION OF THE DRAWINGS

FIGS. 8 (a)-(f) show a sequence of essential steps in the process of transferring a fine-featured structure to both surfaces of a doughnut-shaped transfer element indicated by 100' in FIG. 6 by means of the two-side fine-structure transfer apparatus 1D.

FIGS. 9 (a)-(d) is a schematic diagram showing major steps in a fine-structure transfer method involving the nanoimprint technology based on the optical transfer process.

DESCRIPTION OF EMBODIMENTS

Figure 1A:
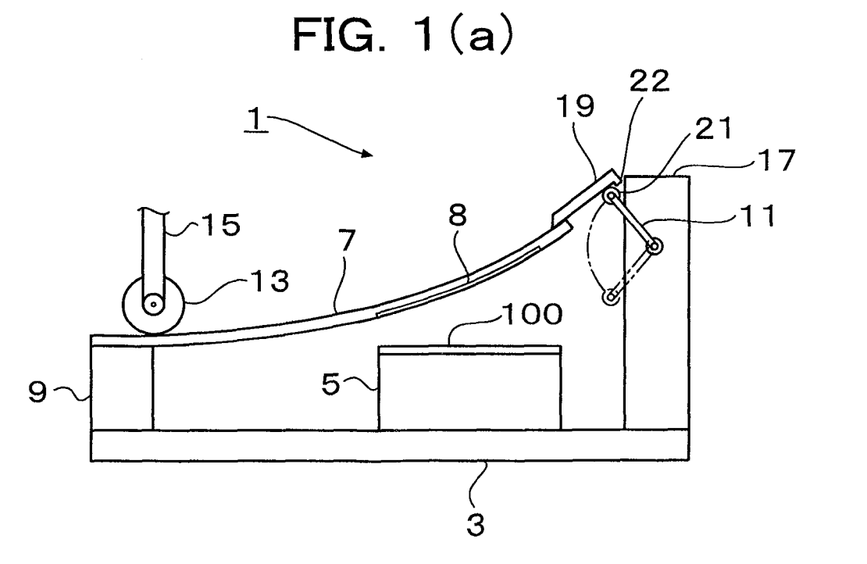
FIG. 1(a) is a front view showing an outline of an embodiment of the fine-structure transfer apparatus according to the first aspect of the present invention, before pressure is applied to a stamper.
Figure 1B:
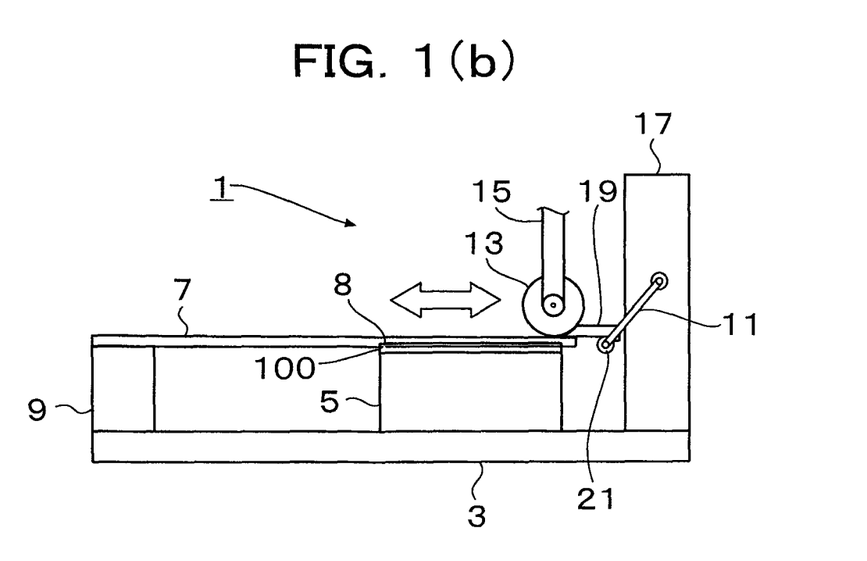
FIG. 1(b) is a front view showing the same, with pressure applied to the stamper.
Figure 2:
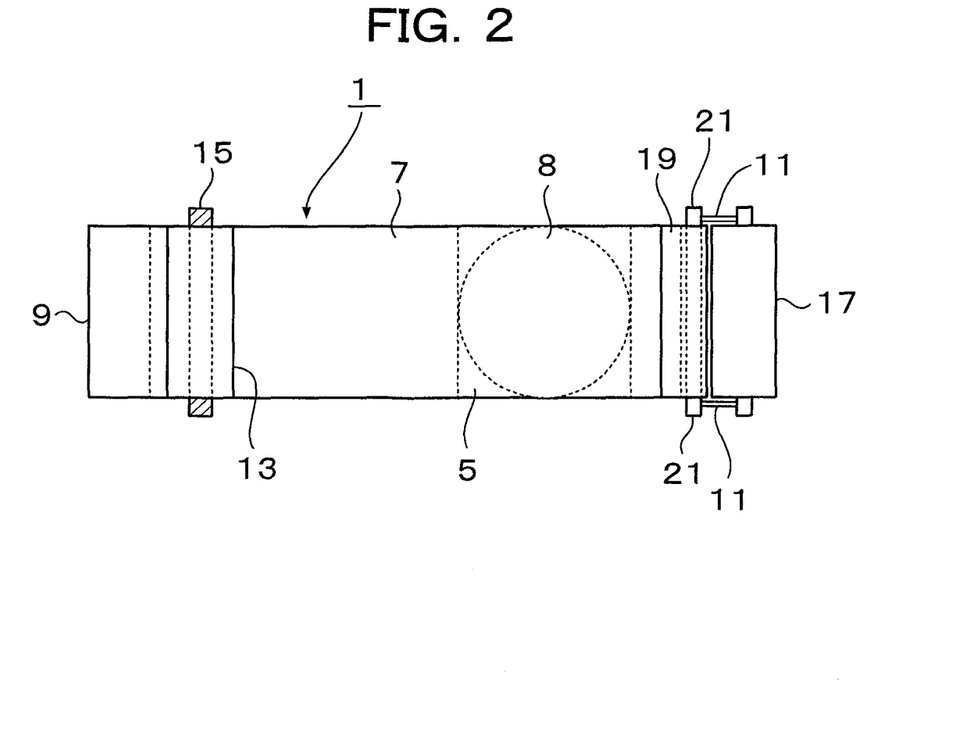
FIG. 2 is a plan view of the fine-structure transfer apparatus shown in FIG. 1.

FIG. 1(a) is a front view showing an outline of an embodiment of the fine-structure transfer apparatus according to the first aspect of the present invention, before pressure is applied to a stamper. FIG. 1(b) is a front view showing the same, with pressure applied to the stamper. FIG. 2 is a plan view of the fine-structure transfer apparatus shown in FIG. 1. The fine-structure transfer apparatus of the present invention which is generally indicated by 1 has the following basic components: a base plate 3, a stage 5 placed on top of the base plate 3 for holding a transfer element 100 in position, and a stamper 7 provided over the stage 5. The stamper 7 is elongated in shape; one of its ends is fixed to a first post 9 and the other end can be lifted upward like a cantilevered spring by means of a pivoting arm 11 that reciprocates in a vertical direction. The pivoting arm 11 is mounted on a second post 17 in such a way that by means of a suitable cam mechanism not shown, it can pivot through a predetermined angle about the mounting shaft. The other end of the stamper 7 has an engagement finger 19 fastened thereto for establishing engagement with the pivoting arm 11 and the free end 21 of the pivoting arm 11 is capable of sliding on the bottom surface of the engagement finger 19. An end portion of the engagement finger 19 is preferably provided with an engagement hook 22 for preventing the free end 21 of the pivoting arm 11 from dropping out. A pressure-applying roller 13 is provided above the stamper 7. The pressure-applying roller 13 is axially supported by a drive arm 15, which creates a depressing force for the roller 13 as it reciprocates on the upper surface of the stamper 7. As shown in FIG. 1(a), the pressure-applying roller 13 is retracted to the farthest end close to the first post 9 and the pivoting arm 11 is caused to pivot to the higher end of its pivoting action so that the stamper 7 is curved upward to provide a wide enough space to allow the transfer element 100 to be attached to or detached from the upper surface of the stage 5. When the transfer element 100 has been placed on top of the stage 5, the pressure-applying roller 13 starts to move towards the second post 17. With the progress of the pressure-applying roller 13, the pivoting arm 11 is caused to descend slowly, whereupon in proportion as the scanning with the pressure-applying roller 13 progresses, the stamper 7 descends as it is gradually pressed against the transfer element 100, starting from its outer periphery and directed radially towards its center. As shown in FIG. 1(b), at the point in time when the scanning with the pressure-applying roller 13 ends, the pivoting arm 11 reaches the lower end of its pivoting action. The lower end of the pivoting action of the arm 11 is preferably equal to slightly lower than the height of the stage 5. The pressure-applying roller 13 is stopped by the engagement finger 19. When the transfer step is over, the pressure-applying roller 13 is moved backwards to the first post 9 as the pivoting arm 11 is caused to pivot to the higher end of its pivoting action until it resumes the position depicted in FIG. 1(a); then, the transfer element 100 to which the fine-featured pattern has been transferred is removed from the stage 5 and a new transfer element 100 is placed on top of the stage 5. In the case of a thermal transfer process, sufficient heat is applied from the pressure-applying roller 13 or the stage 5 to effect transfer. In the case of an optical transfer process, the transfer element 100 is irradiated with UV light from above the stamper 7 to effect transfer. Note that scanning with the pressure-applying roller 13 may be performed independently of the pivoting action of the arm 11. For instance, scanning under pressure with the pressure-applying roller 13 may be started after the arm 11 has descended to the lower end of its pivoting action to bring the stamper 7 into intimate contact with the upper surface of the transfer element 100.

In the fine-structure transfer apparatus according to the first aspect of the present invention, the entire surface of the transfer element 100 is gradually covered with the stamper 7, starting from its outer periphery and directed radially towards its center. As a result, the air present at the interface between the stamper 7 and the transfer element 100 will be pushed to the outside of the interface as the transfer element 100 is being covered with the stamper 7, ensuring that no air will be left at the interface. This substantially eliminates transfer defects that would otherwise occur on account of air bubbles in the conventional fine-structure transfer apparatus. When the transfer step is over, the stamper 7 is gradually detached from the transfer element 100, starting from its outer periphery and directed radially towards its center, thus eliminating the heretofore required step of driving a wedge or the like into the interface between the stamper 7 and the transfer element 100. As a result, the detaching operation will proceed rapidly enough to achieve a marked improvement in efficiency; what is more, little damage will be caused to the transferred pattern, as well as to the stamper 7 and the transfer element 100.

The stamper 7 preferably has sufficient flexibility or elasticity that it can be not only be deformed into a curved shape but also restored to the initial flat state by means of the pivoting arm 11. If the stamper 7 is unduly rigid, it might either bend to break or deform permanently under stress while it is curved by means of the pivoting arm 11, with the result that it can no longer be restored to the initial flat shape. Hence, the stamper 7 is preferably formed of plastics (e.g. polyvinyl chloride, polyethylene, polypropylene, polystyrene, polyethylene terephthalate, and polylactic acid), metals (e.g. aluminum, stainless steel, and copper), or ceramics (e.g. silicon- or glass-based). In the case of a thermal transfer process, the stamper 7 need not be transparent to light but in the case of an optical transfer process, the stamper 7 must be formed of a light-transmitting material.

A fine-featured pattern 8 to be transferred to the transfer element 100 is present on the underside of the stamper 7 in the area that is to be brought into contact with the transfer element 100. The fine-featured pattern 8 may be directly formed in the specified area of the stamper 7; alternatively, a sheet having a separately formed fine-structured pattern may be glued to the specified area of the stamper 7.

Figure 3:
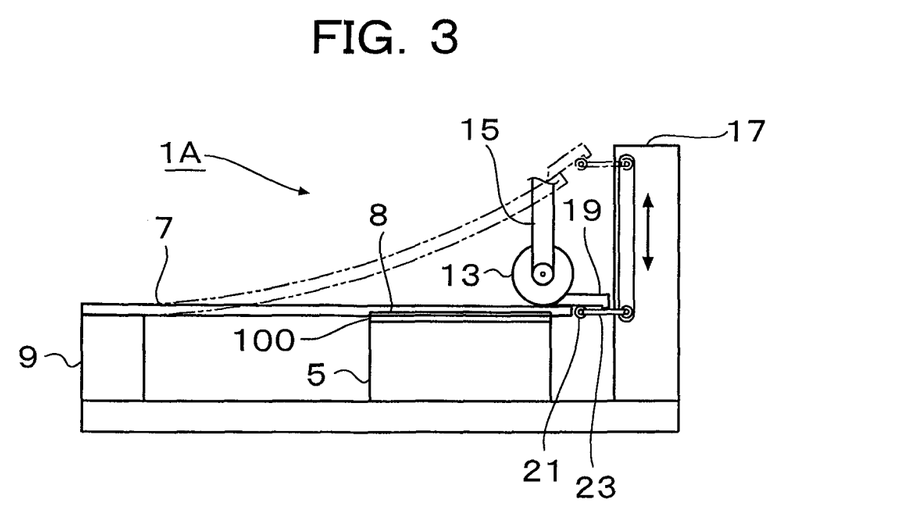
FIG. 3 is a front view showing an outline of another embodiment of the fine-structure transfer apparatus according to the first aspect of the present invention.

FIG. 3(a) and FIG. 3(b) are front views showing an outline of another embodiment of the fine-structure transfer apparatus according to the first aspect of the present invention. In the apparatus shown, the means of vertically moving the stamper 7 is not the pivoting arm but a horizontal arm 23 that vertically moves up and down. The free end 21 of the horizontal arm 23 is capable of sliding on the bottom surface of the engagement finger 19. The horizontal arm 23 may be driven by a known, commonly used drive means or mechanism such as a chain, water pressure, oil pressure, a ball screw, or a linear motor.

Figure 4:
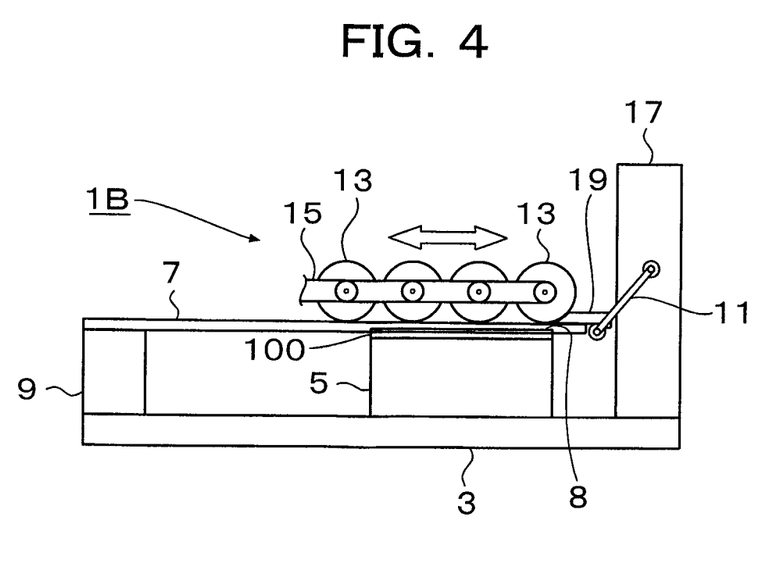
FIG. 4 is a front view showing an outline of yet another embodiment of the fine-structure transfer apparatus according to the first aspect of the present invention.

The fine-structure transfer apparatus shown in FIGS. 1 and 3 uses only one unit of pressure-applying roller 13 but the number of pressure-applying rollers to be used is by no means limited to one. For instance, two or more units of pressure-applying roller 13 may be arranged in parallel as shown in FIG. 4. If more than one unit of pressure-applying roller 13 is used in this way, a sufficiently uniform depressing force can be obtained during transfer to produce a transferred pattern of enhanced quality.

Figure 5A:
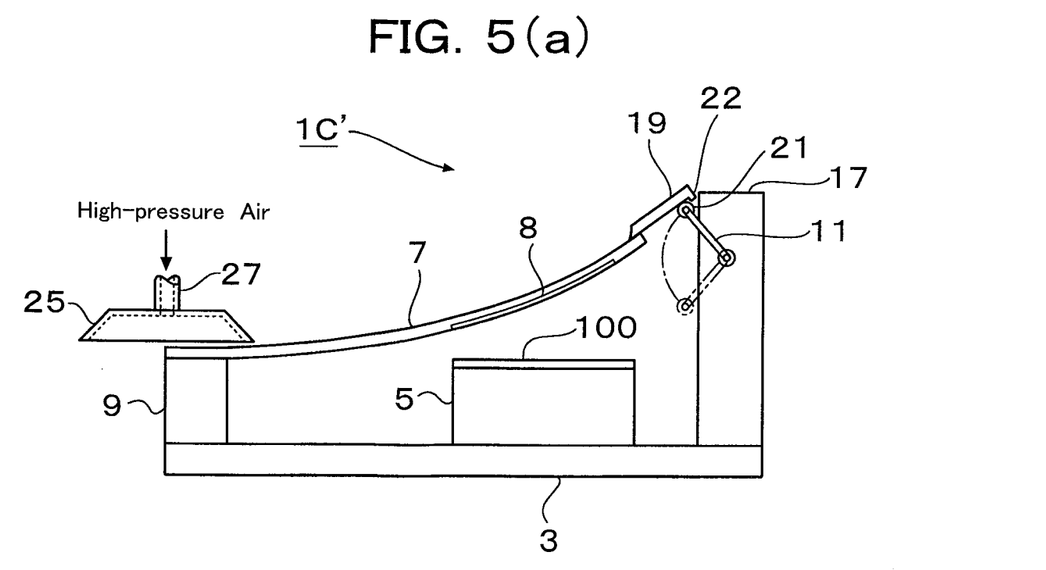
FIG. 5(a) is a front view showing an outline of still another embodiment of the fine-structure transfer apparatus according to the first aspect of the present invention, before pressure is applied to a stamper.
Figure 5B:
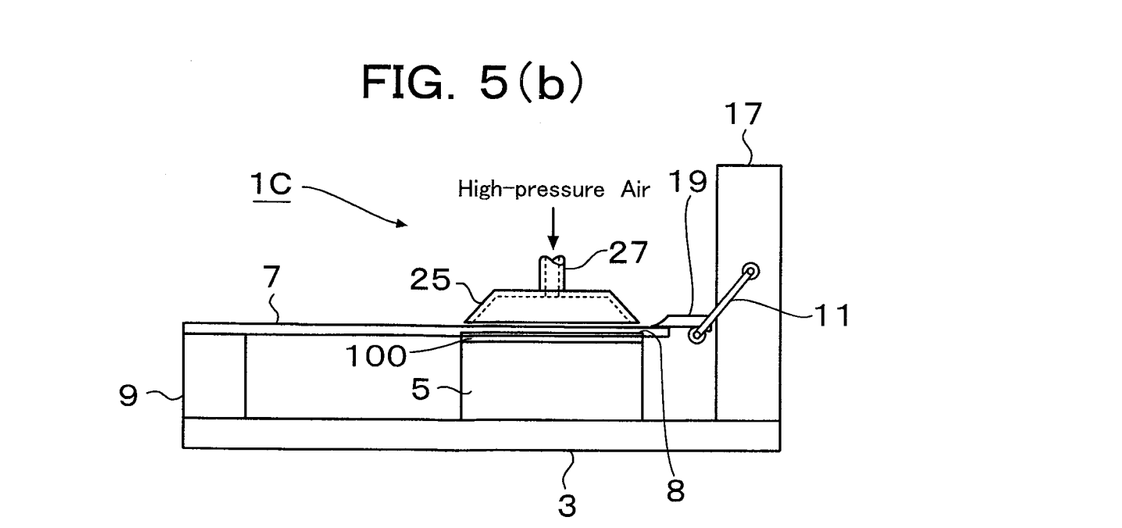
FIG. 5(b) is a front view showing the same, with pressure applied to the stamper.

FIG. 5(a) and FIG. 5(b) are front views showing an outline of still another embodiment of the fine-structure transfer apparatus according to the first aspect of the present invention. The fine-structure transfer apparatus shown in FIG. 1 uses a single unit of pressure-applying roller 13 and the depressing force that is exerted on a given area of the stamper 7 becomes virtually zero after the roller has passed that area during scanning. The fine-structure transfer apparatus shown in FIG. 4 uses more than one unit of pressure-applying roller 13 but the depressing force that is exerted on the valley between adjacent rollers is again zero. To solve the problem of nonuniformity in the depressing force that is exerted by roller scanning, the apparatus shown in FIG. 5 uses an air pad 25 instead of the rollers. The air pad 25 is supported in such a way that it is capable of moving above the stamper 7 keeping a certain distance from the upper surface of the transfer element 100. The air pad 25 is also capable of forcing high-pressure air against the upper surface of the stamper 7. High-pressure air is supplied through a pipe 27. By holding the pipe 27 with an advancing/retracting mechanism not shown, the air pad 25 can be rendered to be capable of reciprocating between the first post 9 and the second post 17.

As shown in FIG. 5(a), the air pad 25 is retracted to the farthest end close to the first post 9 and the pivoting arm 11 is caused to pivot to the higher end of its pivoting action so that the stamper 7 is curved upward to provide a wide enough space to allow the transfer element 100 to be attached to or detached from the upper surface of the stage 5. When the transfer element 100 has been placed on top of the stage 5, the air pad 25 starts to move towards the second post 17. In synchronism with the movement of the air pad 25, the pivoting arm 11 is caused to descend slowly, whereupon in proportion as the air pad 25 advances, the stamper 7 descends as it is gradually pressed against the transfer element 100, starting from its outer periphery and directed radially towards its center.

As shown in FIG. 5(b), at the point in time when the air pad 25 stops advancing, the pivoting arm 11 reaches the lower end of its pivoting action. The air pad 25 supplies high-pressure air to ensure that a sufficiently uniform pressure to produce a depressing force is applied to the entire surface of the transfer element 100 from above the stamper 7. Another advantage of the air pad 25 is that with it being maintained immediately above the transfer element 100, the depressing force can be applied from above the stamper 7 and retained on the entire surface of the transfer element 100 for any length of time. This ensures that the fine structure on the stamper 7 can be transferred to the transfer element 100 without suffering any defects.

When the transfer step is over, the air pad 25 is moved backwards to the first post 9 as the pivoting arm 11 is caused to pivot to the higher end of its pivoting action. In the case of a thermal transfer process, air heated to a predetermined temperature is forced from the air pad 25 or, alternatively, sufficient heat is applied from the stage 5 to effect transfer. In the case of an optical transfer process, the transfer element 100 is irradiated with UV light from above the air pad 25 that is made of a transparent material (e.g. quartz) and the stamper 7, also made of a transparent material, to effect transfer. Note that scanning with the air pad 25 may be performed independently of the pivoting action of the arm 11. For instance, scanning under pressure with the air pad 25 may be started after the arm 11 has descended to the lower end of its pivoting action to bring the stamper 7 into intimate contact with the upper surface of the transfer element 100.

The transfer element that may be used in a transfer process by means of the fine-structure transfer apparatus according to the first aspect of the present invention is not limited to a completely round substrate but encompasses an annular (doughnut-shaped) disk of substrate having a circular through-hole of a predetermined inner diameter at the center. Needless to say, the upper surface of the stage 5 and the stamper 7 may be changed in shape according to the shape of the transfer element to be used.

Each of the fine-structure transfer apparatuses depicted in FIGS. 1 to 5 is only capable of performing a transfer process on one side of the transfer element 100. If two-side transfer is to be performed, the conventional parallel-plate press mechanism involves difficulty achieving simultaneous transfer to both surfaces of the transfer element. If two-side simultaneous transfer need be performed with this mechanism, the backside of the transfer element must be kept out of contact with any extraneous matter before the actual transfer step is started. However, if, in order to ensure this, the transfer element is gripped only by the outer periphery, it might deflect during the application of a depressing force, which might then fail to be transmitted properly, causing poor transfer.

Figure 6:
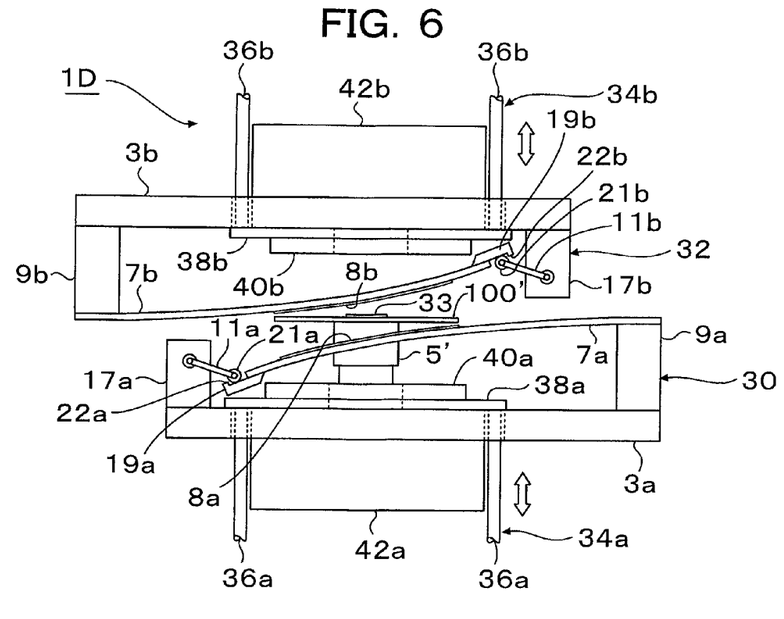
FIG. 6 is a front view showing an outline of an embodiment of the two-side fine-structure transfer apparatus according to the second aspect of the present invention.

To solve this problem, the present invention provides a two-side fine-structure transfer apparatus that performs a transfer process simultaneously on both sides of the transfer element 100. FIG. 6 is a front view showing an outline of an embodiment of the two-side fine-structure transfer apparatus according to the second aspect of the present invention, which is indicated by 1D and intended for simultaneous transfer of a fine structure to both sides of a transfer element 100' which is a doughnut-shaped disk of substrate. The two-side fine-structure transfer apparatus 1D comprises a lower fine-structure transfer device 30 and an upper fine-structure transfer device 32. Although not shown, a suitable retainer is used to hold the two fine-structure transfer devices 30 and 32 in such a way that they are spaced apart by a predetermined distance to face each other.

The lower fine-structure transfer device 30 has a lower base plate 3a with a stage 5' provided on its upper surface. The stage 5' has a circular projection 33 of a predetermined height on its upper surface; the projection 33 is passed through a circular through-hole of a predetermined inner diameter bored at the center of the transfer element 100' which is a doughnut-shaped disk of substrate. The lower base plate 3a is also provided with a first post 9a and a second post 17a; to the first post 9a, one end of a lower stamper 7a is fixed, and the second post 17a is provided with a lower pivoting arm 11a. The other end of the lower stamper 7a has an engagement finger 19a fastened thereto for establishing engagement with the lower pivoting arm 11a and the free end 21a of the lower pivoting arm 11a is capable of sliding on the surface of the engagement finger 19a. An end portion of the engaging finger 19a is preferably provided with an engagement hook 22a for preventing the free end 21a of the lower pivoting arm 11a from dropping out. A first fine-featured pattern 8a is formed on the transfer surface of the lower stamper 7a. The apparatus 1D does not use the pressure-applying roller 13 or aid pad 25 but uses a lower depressing unit 34a and an upper depressing unit 34b, each being capable of advancing or retracting vertically. The lower depressing unit 34a is provided on the topside of the lower base plate 3a. It has two lower shafts 36a passing through the lower base plate 3a, a lower depressing plate 38a to which the lower shafts 36a are fixed, and a lower resin cushion layer 40a provided on the lower depressing plate 38a. The lower resin cushion layer 49a works like a cushion and serves to ensure that pressure application from the lower depressing plate 38a to the lower stamper 7a will be uniform or have a pressure gradient. The bottom side of the lower base plate 3a is provided with a lower UV light irradiating unit 42a.

The upper fine-structure transfer device 32 has generally the same configuration as the lower fine-structure transfer unit 30, except that it does not have the stage 5'. To be more specific, it has an upper base plate 3b that is provided with a first post 9b and a second post 17b; to the first post 9b, one end of an upper stamper 7b is fixed, and the second post 17b is provided with an upper pivoting arm 11b. The other end of the upper stamper 7b has an engagement finger 19b fastened thereto for establishing engagement with the upper pivoting arm 11b and the free end 21b of the upper pivoting arm 11b is capable of sliding on the surface of the engagement finger 19b. A second fine-featured pattern 8b is formed on the transfer surface of the upper stamper 7b. The upper depressing unit 34b is provided on the bottom side of the upper base plate 3b. It has two upper shafts 36b passing through the upper base plate 3b, an upper depressing plate 38b to which the upper shafts 36b are fixed, and an upper resin cushion layer 40b provided on the upper depressing plate 38b. The topside of the upper base plate 3b is provided with an upper UV light irradiating unit 42b. The major difference between the upper fine-structure transfer device 32 and the lower fine-structure transfer device 30 is that the first post 9b and the second post 17b in the former are positioned on the side away from the first post 9a and the second post 17b in the latter. The first fine-featured pattern 8a on the lower stamper 7a may be the same as or different from the second fine-featured pattern 8b on the upper stamper 7b.

Figure 8A:
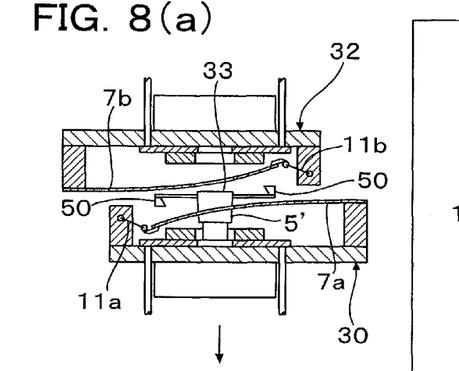

To ensure simultaneous transfer of a fine structure to both surfaces of a transfer element, the two-side fine-structure transfer apparatus according to the second aspect of the present invention is preferably adapted to be such that the lower fine-structure transfer device 30 and the upper fine-structure transfer device 32 are positioned in symmetry with respect to the center point of the stage 5'. The advantage of this positional relationship is that when the upper stamper 7b and the lower stamper 7a are curved with respect to the transfer element 100' by means of the respective associated pivoting arms, they will be curved in opposite directions with respect to the transfer element 100', securing a sufficient space for accommodating a handling mechanism 50 (see FIG. 8) that may be used to attach the transfer element 100' to the stage 5' or detach it from the latter.

Figure 7:
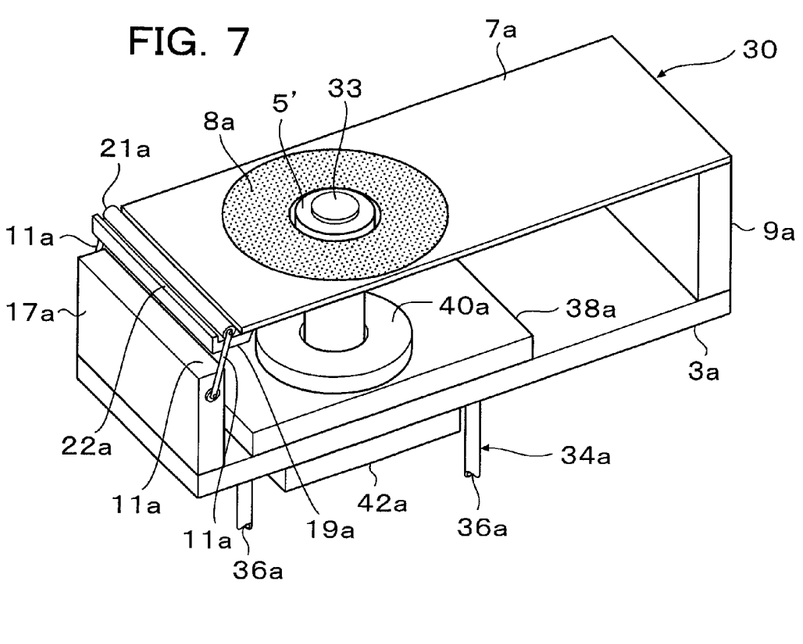
FIG. 7 is a perspective view showing an outline of a lower fine-structure transfer device indicated by 30 in the two-side fine-structure transfer apparatus indicated by 1D in FIG. 6.

FIG. 7 is a perspective view showing an outline of the lower fine-structure transfer device 30. A through-hole of a predetermined inner diameter that is sufficient to allow passage of the stage 5' fixed to the lower base plate 3a is formed in generally the center of the lower depressing plate 38a and the lower resin cushion layer 40a. A hole through which the stage 5' can pass is also opened in the lower stamper 7a, and the first fine-featured pattern 8a is provided around this hole. The upper fine-structure transfer device 32 has generally the same configuration as the lower fine-structure transfer device 30 depicted in FIG. 7.

FIG. 8 shows a sequence of essential steps in the process of transferring a fine structure to both surfaces of the doughnut-shaped transfer element 100' by means of the two-side fine-structure transfer apparatus 1D depicted in FIG. 6.

In step (a), a pair of handling arms 50 are operated such that the projection 33 on top of the stage 5' is passed through the through-hole in the transfer element 100' which is a doughnut-shaped disk of substrate having a resist coat on both the upper and lower surfaces.

Figure 8B:
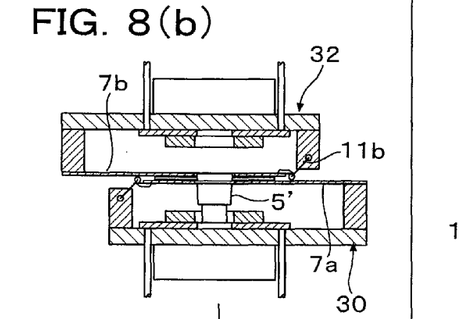

In step (b), the upper pivoting arm 11b in the upper fine-structure transfer device 32 is allowed to pivot downward until the upper stamper 7b is brought into intimate contact with the upper surface of the transfer element 100'; at the same time, the lower pivoting arm 11a in the lower fine-structure transfer device 30 is allowed to pivot upward until the lower stamper 7a is brought into intimate contact with the lower surface of the transfer element 100'. The process of making intimate contact between the stamper and the transfer element proceeds in two opposite directions, first starting from the outer periphery of the transfer element and directed radially toward the center, and then vice versa. As a result, any residual air that may be present at the interface between the stamper and the transfer element can be pushed outside to establish intimate contact between the two parts.

Figure 8C:
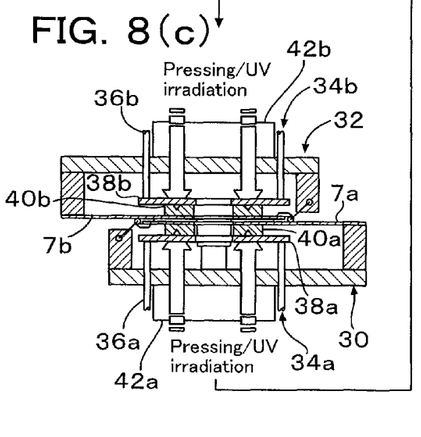

In step (c), the lower shafts 36a in the lower depressing unit 34a of the lower fine-structure transfer device 30 are lifted so that the lower resin cushion layer 40a provided on the lower depressing plate 38a is depressed towards the bottom of the lower stamper 7a; at the same time, the upper shafts 36b in the upper depressing unit 34b of the upper fine-structure transfer device 32 are lowered so that the upper resin cushion layer 40b provided on the upper depressing plate 38b is depressed towards the top of the upper stamper 7b. In conjunction with these actions, the upper UV light irradiating unit 42a and the lower UV light irradiating unit 42b apply UV light to harden the resist coat. Since the lower depressing unit 34a and the upper depressing unit 34b push each other, the first fine-featured pattern 8a on the lower stamper 7a is transferred to the lower surface of the transfer element 100' and the second fine-featured pattern 8b on the upper stamper 7b to its upper surface.

Figure 8D:
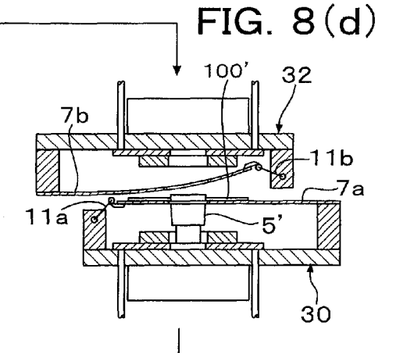

When the transfer step is over, the process goes to step (d), in which the upper pivoting arm 11b in the upper fine-structure transfer device 32 is caused to pivot upward so that the upper stamper 7b is detached from the upper surface of the transfer element 100'. Since the lower stamper 7a is in intimate contact with the lower surface of the transfer element 100', the upper stamper 7b can be detached from the upper surface of the transfer element 100' with no problem.

Figure 8E:
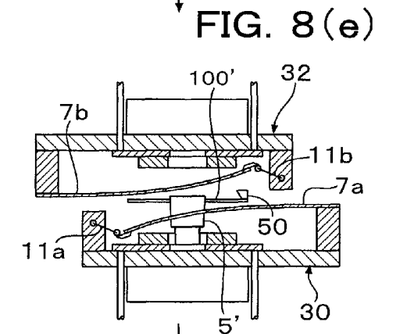

Then, in step (e), with the outer periphery of the transfer element 100' being held in position by one of the two handling arms 50, the lower pivoting arm 11a in the lower fine-structure transfer device 30 is caused to pivot downward so that the lower stamper 7a is detached from the lower surface of the transfer element 100'. The process of detaching the stampers proceeds in two opposite directions, first starting from the outer periphery of the transfer element and directed radially toward the center, and then vice versa. As a result, the stampers can be easily detached from the transfer element without damaging the transferred patterns.

Figure 8F:
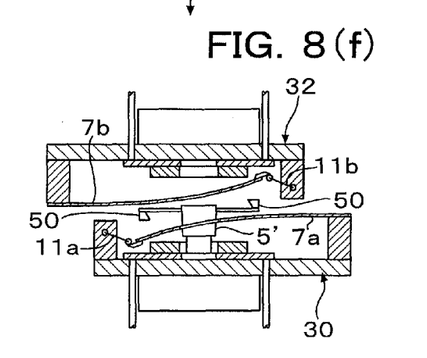

Lastly, in t step (f), the transfer element 100' to which the fine patterns have been transferred is removed from the stage 5' and a new transfer element 100' mounted on the stage 5' by manipulation with the pair of handling arms 50.

Since the two-side fine-structure transfer apparatus 1D depicted in FIG. 6 is operated by the optical transfer process, the base plate 3a, depressing plate 38a, resin cushion layer 40a and stamper 7a in the lower fine-structure transfer device 30, as well as the base plate 3b, depressing plate 38b, resin cushion layer 40b and stamper 7b in the upper fine-structure transfer device 32 must all be formed of a light-transmitting material.

INDUSTRIAL APPLICABILITY

While the fine-structure transfer apparatus of the present invention has been described on the foregoing pages with reference to the preferred embodiments, it should be understood that the present invention is by no means limited to those embodiments but may be modified in various ways. For example, the longitudinal dimension of the first post 9 may be sufficiently increased to ensure that even when more than one roller 13 or an air pad 25 of an increased longitudinal dimension is used, the stamper 7 will not curve irregularly in areas near the point where it is fixed.

In another modified version, the stages 5 and 5' may be provided with an XY movement control mechanism in order to ensure positional alignment between the fine-featured pattern on the stamper and the transfer element.

The invention claimed is:

1. A fine-structure transfer apparatus comprising:
a base plate;
a first post and a second post erected on an upper surface of the base plate;
an elongated stamper that is fixed at a first end to an upper end face of the first post and which is supported at a second end in a vertically movable manner by means of an ascending/descending unit provided on the second post;
a transfer element holding stage disposed on the upper surface of the base plate between the first and second posts at a position that corresponds to a position of a lower surface of the elongated stamper where a fine pattern is disposed; and
a pressure-applying unit to reciprocate on the upper surface of the elongated stamper along a longitudinal direction of the elongated stamper,
wherein an engagement finger for engaging a free end of a pivoting arm of the ascending/descending unit is fastened to the upper surface of the second end of the elongated stamper and the engagement finger has at an end portion thereof an engagement hook for preventing the free end of the pivoting arm from dropping out.

2. The fine-structure transfer apparatus according to claim 1, wherein the ascending/descending unit is a pivoting arm that pivots through a predetermined angle about a mounting shaft provided on the second post, a free end of the pivoting arm being in engagement with the second end of the elongated stamper, whereby the elongated stamper is supported in a vertically movable manner.

3. The fine-structure transfer apparatus according to claim 1, wherein the ascending/descending unit is a horizontal arm supported by a drive mechanism provided on the second post to move up and down in a vertical direction, a free end of the horizontal arm being in engagement with the second end of the elongated stamper, whereby the elongated stamper is supported in a vertically movable manner.

4. The fine-structure transfer apparatus according to claim 1, wherein the pressure-applying unit consists of one or more pressure-applying rollers that rotate to move in contact with the upper surface of the elongated stamper.

5. The fine-structure transfer apparatus according to claim 1, wherein the pressure-applying unit is an air pad that moves along, while making no contact with, the upper surface of the elongated stamper as it applies high-pressure air to the upper surface of the elongated stamper.

6. A fine-structure transfer apparatus for transferring a fine structure to both sides of a transfer element or an annular disk substrate having a through-hole of a predetermined inner diameter in the center, the fine structure transfer apparatus comprising:

a lower fine-structure transfer device including:
a base plate, a first post and a second post erected to face up on an upper surface of the base plate, a lower elongated stamper that is fixed at a first end to an upper end face of the first post and which is supported at a second end in a vertically movable manner by means of an ascending/descending unit provided on the second post, a transfer element holding cylindrical stage disposed on the upper surface of the base plate between the first and second posts at a position that corresponds to a position of an upper surface of the lower elongated stamper where a fine-featured pattern is disposed, a lower pressure-applying unit disposed on the upper surface of the base plate for pressing the lower elongated stamper against a lower surface of the transfer element from below the lower elongated stamper, and a lower UV light irradiating unit disposed on a lower surface of the base plate, the transfer element holding cylindrical stage having a cylindrical projection of a predetermined outer diameter disposed on an upper end face thereof, a through-hole of a predetermined inner diameter being opened in the center of the fine-featured pattern on an upper side of the lower elongated stamper, and the transfer element holding cylindrical stage being passed through the through-hole of the lower elongated stamper; and an upper fine-structure transfer device including: a base plate, a first post and a second post erected to face down on a lower surface of the base plate, an upper elongated stamper that is fixed at a first end to an upper end face of the first post and which is supported at a second end in a vertically movable manner by means of an ascending/descending unit provided on the second post, an upper pressure-applying unit provided on the lower surface of the base plate for pressing the upper elongated stamper against an upper surface of the transfer element from above the upper elongated stamper, and an upper UV light irradiating unit provided on an upper surface of the base plate, a second through-hole of a predetermined inner diameter being opened in the center of the fine-featured pattern on a lower side of the upper elongated stamper such that the cylindrical projection on the upper end face of the transfer element holding cylindrical stage can be passed through the through-hole, wherein the lower fine-structure transfer device and the upper fine-structure transfer device are positioned in symmetry with respect to a center point of the transfer element holding cylindrical stage, and wherein a lower engagement finger for engaging a free end of a pivoting arm of the ascending/descending unit is fastened to the upper surface of the second end of the lower elongated stamper and the lower engagement finger has at an end portion thereof an engagement hook for preventing the free end of the pivoting arm from dropping out, wherein an upper engagement finger for engaging a free end of a pivoting arm of the ascending/descending unit is fastened to the upper surface of the second end of the upper elongated stamper and the upper engagement finger has at an end portion thereof an engagement hook for preventing the free end of the pivoting arm from dropping out.

7. The fine-structure transfer apparatus according to claim 6, wherein each of the ascending/descending units is a pivoting arm that pivots through a predetermined angle about a mounting shaft provided on the respective second post, a free end of the pivoting arm being in engagement with the second end of the associated elongated stamper, whereby the respective elongated stamper is supported in a vertically movable manner.

8. The fine-structure transfer apparatus according to claim 6, wherein each of the ascending/descending units is a horizontal arm supported by a drive mechanism provided on the respective second post to move up and down in a vertical direction, a free end of the horizontal arm being in engagement with the other end of the respective elongated stamper, whereby the respective elongated stamper is supported in a vertically movable manner.

9. The fine-structure transfer apparatus according to claim 6, wherein each of the lower and upper elongated stampers is a flexible elongated stamper.

10. A fine-structure transfer apparatus comprising:
a base plate;
a first post and a second post erected on an upper surface of the base plate;
an elongated stamper that is fixed at a first end to an upper end face of the first post and which is supported at a second end in a vertically movable manner by means of an ascending/descending unit provided on the second post;
a transfer element holding stage disposed on the upper surface of the base plate between the first and second posts at a position that corresponds to a position of a lower surface of the elongated stamper where a fine pattern is disposed;
a pressure-applying unit to reciprocate on the upper surface of the elongated stamper along a longitudinal direction of the elongated stamper; and
an engagement finger to engage a free end of the ascending/descending unit is fastened to the upper surface of the second end of the elongated stamper and the engagement finger has an engagement hook for preventing the free end of the ascending/descending unit from dropping out,
wherein the ascending/descending unit is stopped by the engagement finger.

11. A fine-structure transfer apparatus for transferring a fine structure to both sides of a transfer element or an annular disk substrate having a through-hole of a predetermined inner diameter in the center, the fine structure transfer apparatus comprising:

a lower fine-structure transfer device including:

a base plate, a first post and a second post erected to face up on an upper surface of the base plate, a lower elongated stamper that is fixed at a first end to an upper end face of the first post and which is supported at a second end in a vertically movable manner by means of an ascending/descending unit provided on the second post, a transfer element holding cylindrical stage disposed on the upper surface of the base plate between the first and second posts at a position that corresponds to a position of an upper surface of the lower elongated stamper where a fine-featured pattern is disposed, a lower pressure-applying unit disposed on the upper surface of the base plate for pressing the lower elongated stamper against a lower surface of the transfer element from below the lower elongated stamper, and a lower UV light irradiating unit disposed on a lower surface of the base plate, the transfer element holding cylindrical stage having a cylindrical projection of a predetermined outer diameter disposed on an upper end face thereof, a through-hole of a predetermined inner diameter being opened in the center of the fine-featured pattern on an upper side of the lower elongated stamper, and the transfer element holding cylindrical stage being passed through the through-hole of the lower elongated stamper; and an upper fine-structure transfer device including: a base plate, a first post and a second post erected to face down on a lower surface of the base plate, an upper elongated stamper that is fixed at a first end to an upper end face of the first post and which is supported at a second end in a vertically movable manner by means of an ascending/descending unit provided on the second post, an upper pressure-applying unit provided on the lower surface of the base plate for pressing the upper elongated stamper against an upper surface of the transfer element from above the upper elongated stamper, and an upper UV light irradiating unit provided on an upper surface of the base plate, a second through-hole of a predetermined inner diameter being opened in the center of the fine-featured pattern on a lower side of the upper elongated stamper such that the cylindrical projection on the upper end face of the transfer element holding cylindrical stage can be passed through the through-hole, wherein the lower fine-structure transfer device and the upper fine-structure transfer device are positioned in symmetry with respect to a center point of the transfer element holding cylindrical stage, wherein a lower engagement finger to engage a free end of the lower ascending/descending unit is fastened to the lower surface of the second end of the lower elongated stamper and the lower engagement finger has at an end portion thereof a lower engagement hook for preventing the free end of the lower ascending/descending unit from dropping out, and wherein an upper engagement finger to engage a free end of the upper ascending/descending unit is fastened to the upper surface of the second end of the upper elongated stamper and the upper engagement finger has at an end portion thereof an upper engagement hook for preventing the free end of the upper ascending/descending unit from dropping out, and the upper and lower ascending/descending units are respectively stopped by the upper and lower engagement fingers.

* * * * *